May 11, 1943.   O. S. FIX   2,319,120
APPARATUS FOR SEGMENTING AND PITTING FRUIT HAVING PITS
Filed Oct. 6, 1941   2 Sheets-Sheet 2

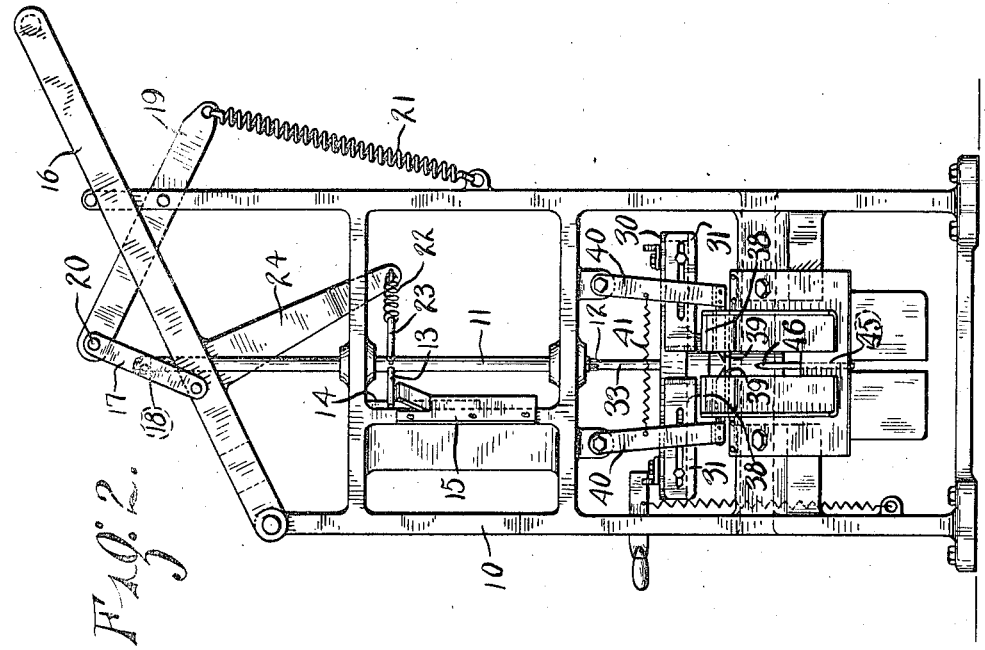
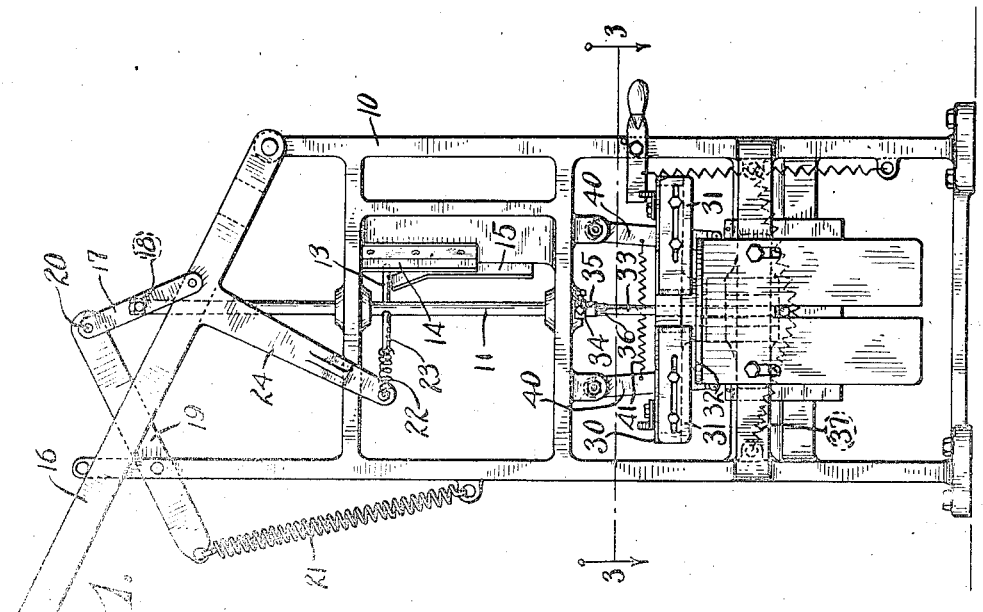

INVENTOR.
ORAL S. FIX,
BY Hood & Hahn.
ATTORNEYS.

Patented May 11, 1943

2,319,120

UNITED STATES PATENT OFFICE 2,319,120

APPARATUS FOR SEGMENTING AND PITTING FRUITS HAVING PITS

Oral S. Fix, Tampa, Fla., assignor to The Polk Development Company, Tampa, Fla., a copartnership composed of Ralph Polk, Sr. and Ralph Polk, Jr.

Application October 6, 1941, Serial No. 413,726

8 Claims. (Cl. 146—28)

The object of my invention is to provide mechanism by means of which fruits having pits such, for instance, as peaches, may be conveniently manipulated to slice the meat into segments and separate them from the pits.

The accompanying drawings illustrate my invention.

Fig. 1 is an elevation of one side of a machine embodying my invention;

Fig. 2 is an elevation of the opposite side;

Figure 3:
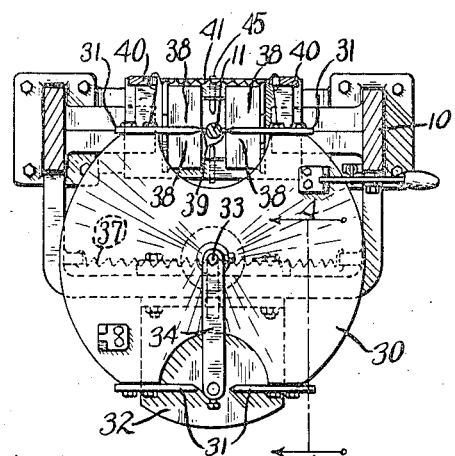
Figure 4:
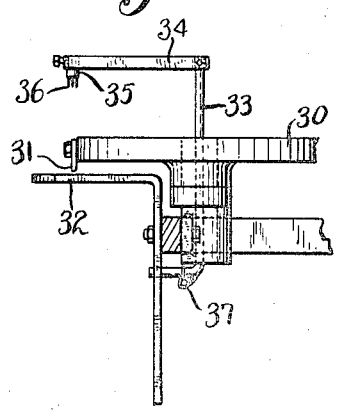

Fig. 3 a horizontal section on line 3—3 of Fig. 1;

Fig. 4 a fragmentary medial vertical section; and

Figure 5:
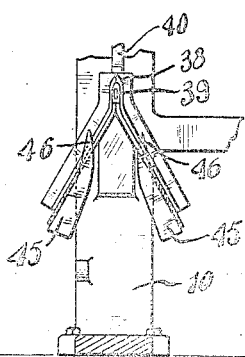

Fig. 5 a fragmentary medial section below the plane of the knives 31.

In the drawings 10 indicates a suitable main frame in which is a vertically reciprocable plunger 11 provided at its lower end with prongs 12 adapted to puncture the meat of a fruit and engage and straddle one end of the pit of the fruit. Plunger 12 is oscillatable about its axis and is provided with a radial finger 13, the outer end of which cooperates with a vertically arranged stop flange 14 and coordinated cam flange 15. Plunger 11 is vertically reciprocable by means of a lever 16 connected by links 17 and cross head 18 to the plunger, and a lever 19 connected by cross pin 20 with links 17 and biased in plunger raising direction by spring 21. Plunger 11 is rotatively spring biased to a neutral position by a spring 22 connected at one end to a radial arm 23 (conveniently a rearwardly projecting end of finger 13), carried by plunger 11 and connected at the other end to an arm 24 anchored on lever 16 and so positioned on lever 16, as indicated in the drawings, that, as said lever is swung in opposite directions, plunger 11 will be alternately rotatively spring biased in opposite directions.

Journalled on frame 10, conveniently on an axis parallel with the axis of plunger 11, is a turntable 30 provided with a plurality of pairs or fruit-holding meat-slicing knives 31—31 with the vertical edges of their adjacent ends conveniently sharpened and spaced apart a distance a trifle greater than the diameter of the pits of the fruits which are to be handled.

Arranged on the feed side of the machine immediately below the paths of travel of knife pairs 31 is a platform 32 which serves as a gauge for positioning fruit between the sharpened adjacent ends of the knife pairs 31. Vertically reciprocable in the axis of table 30 is a plunger 33 provided at its upper end with a cross arm 34 carrying at its outer end a depending pin 35 having pit-engaging prongs 36 at its lower end and vertically aligned above the gap between the knife pairs 31 when said pairs are medially positioned above platform 32.

Plunger 33 is biased to its upper position by a spring 37.

Arranged beneath the path of travel of the fruit-holding knives 31 and conveniently diametrically opposite from the loading platform 32 are guide plates 38—38, the upper ends of which are vertical so that the fruit-holding knives 31 may align therewith and the lower ends of which are oppositely flared to form a guideway for the fruit-meat segments.

Projecting inwardly in opposite directions into the gap between the guide plates 38—38 are two meat-slicing knives 39—39 each of which is carried by the lower end of an arm 40 pivoted on the main frame. The knives 39—39 are spring biased toward each other by a spring 41 connecting the lower ends of arms 40. The exposed upper edges of knives 39 are downwardly inclined and sharpened and arranged in the plane of the fruit-holding knives 31 when said knives are brought into the vertical plane of guides 38.

The operation is as follows:

A pair of holding knives 31 having been positioned above platform 32, the operator impales a fruit, in the stem-blossom diameter, on pin 35 and then, by depressing plunger 33, drives the fruit down between the holding blades 31—31, whereupon plunger 33 is released and pin 35 withdrawn from the fruit. It will be readily understood at this point that the operator may dispense with the use of plunger 33 and pin 35 and place the fruit between blades 31, although greater accuracy of placement may be obtained by making use of pin 35.

The turntable 30 is thereupon rotated to bring the fruit vertically above guides 38—38. Lever 16 being in its upper position, finger 13 is held against flange 14 by spring 22. When the lever 16 is depressed, arm 23 biases finger 13 in the opposite direction to bring it into contact with cam flange 15 and the lower end of plunger 11 penetrates the fruit and prongs 12 engage the pit and drive the fruit downwardly between guides 38, the knives 39 entering the slits previously made by knives 31 but, because of their inward bias, sweeping the pit both above and below its greatest diameter thereby completing the slitting of the fruit meat. The downward movement of plunger 11 carries the slitted fruit below knives 39 and the segments of the fruit meat engage the flared ends of guides 38 so as to be pried from the fruit pit. In many instances the fruit pit will drop freely from the lower end of plunger 11 but, as said plunger nears the lowest position, finger 13 is carried below the lower end of cam flange 15 so that spring 37 gives the plunger a sharp rotative snap which will free the pit from the plunger. Upon the return stroke of lever 16, spring 37 will rotatively bias plunger 33 in the opposite direction so as to swing finger 13 over the top of cam flange 15 and into engagement with stop flange 14. The upper end of cam flange 15 is flared outwardly from stop flange 14 so as to insure entry of finger 13 between the two flanges 14 and 15 at the beginning of the downward stroke of lever 16.

It will be readily understood that various details of construction may be modified and that mechanism may be provided for obtaining automatic reciprocation of lever 16 and automatic rotation of turntable 30 without departing from the fundamental characteristics of my invention.

In order to insure separation of the meat segments from the pit, I arrange between each pair of guides 38, below the apex of the flare thereof, a finger 45 the tip 46 of which projects slightly above the plane of the outwardly inclined portions of said guides, as shown in Fig. 5, so that in case a pit hangs in one or the other of the meat halves, the tip of this finger will engage the pit and strip it from the fruit half as the fruit half is propelled along the guide.

I claim as my invention:

1. Apparatus for treating fruits having pits, comprising a reciprocatory oscillable plunger having a free end substantially smaller than the fruit to be treated and larger than the pit thereof and formed to rotatively interlock with such pit, a pair of fruit-meat-slitting blades having edges facing each other and spaced apart to form a gap the axis of which substantially coincides with the axis of said plunger in its projected position and the width of which is greater than a fruit-pit diameter and less than a fruit diameter, a pair of inverted Y guides arranged beyond the said slitting blades with their stems respectively in the planes of said blades, means by which said plunger may be axially shifted to penetrate the meat of a fruit and engage its pit and thereafter propel a fruit from between the slitting blades and on to said guides, and means for turning said plunger about its axis during its projection.

2. Apparatus for treating fruits having pits, comprising, a main frame, a fruit holder comprising a pair of fruit-meat-slitting blades arranged in a common plane with facing edges laterally spaced more than a fruit-pit diameter and less than a full-fruit diameter, an associated pair of meat-slitting knives arranged beyond said blades with their facing edges normally spaced less than a fruit-diameter and shiftable in paths of travel normal their facing edges, a fruit-meat-penetrating fruit-pit-engaging plunger axially shiftable along a path of travel medially between the adjacent edges of said blades and knives to an extent sufficient to drive a fruit from between and beyond said blades and knives, and fruit-meat-segment guides arranged adjacent the path of travel of said plunger beyond said knives.

3. Apparatus of the character specified in claim 2 wherein the plunger is rotative about its axis and provided with means for rotatively engaging a fruit-pit, and including means for automatically suddenly rotatively snapping the plunger after the fruit-meat-segments have engaged the guides.

4. Apparatus of the character specified in claim 2 wherein the plunger is rotative about its axis, and including means by which the said plunger may be reciprocated, an arm carried by said plunger, a runway traversable by said arm during only a portion of the axial movement of the plunger, and spring means acting on said plunger to alternatively rotatively bias said plunger toward and from said runway.

5. Apparatus of the character specified in claim 2 and including pit-engaging means coordinated with the meat-segment guides to restrain lateral movement of the pit.

6. Apparatus for treating fruits having pits, comprising, a pair of opposed meat-slitting knives having facing edges, a pit-engaging plunger in a line between the facing edges of said knives, a pair of opposed meat-slitting and holding elements having spaced facing edges, a carrier for said slitting and holding elements to position the gap therebetween in line between said plunger and said knives or to laterally offset said gap relative to the first-mentioned meat-slitting knives, and means for causing relative movement between the plunger and knives in the plunger line to cause traverse of the fruit between said slitting and holding elements and said knives.

7. Apparatus for treating fruits having pits, comprising, a pair of opposed meat-slitting knives having facing edges, a pit-engaging plunger in a line between the facing edges of said knives, a pair of opposed meat-slitting and holding elements having spaced facing edges, a carrier for said slitting and holding elements to position the gap therebetween in line between said plunger and said knives or to laterally offset said gap relative to the first-mentioned meat-slitting knives, and means for causing relative movement between the plunger and knives in the plunger line to cause traverse of the fruit between the knives and to carry the pit beyond said slitting and holding elements and said knives.

8. Apparatus for treating fruits having pits, comprising, a pair of opposed meat-slitting knives having facing edges, a pit-engaging plunger in a line between the facing edges of said knives, a pair of opposed meat-slitting and holding elements having spaced facing edges, a carrier for said slitting and holding elements to position the gap therebetween in line between said plunger and said knives or to laterally offset said gap relative to the first-mentioned meat-slitting knives, means for causing relative movement between the plunger and knives in the plunger line to cause traverse of the fruit between said slitting and holding elements and said knives, and means for causing relative rotation between the fruit pit and fruit meat.

ORAL S. FIX.